I. R. REBER.
MOWER ATTACHMENT.
APPLICATION FILED SEPT. 5, 1911.
1,056,122.
Patented Mar. 18, 1913.
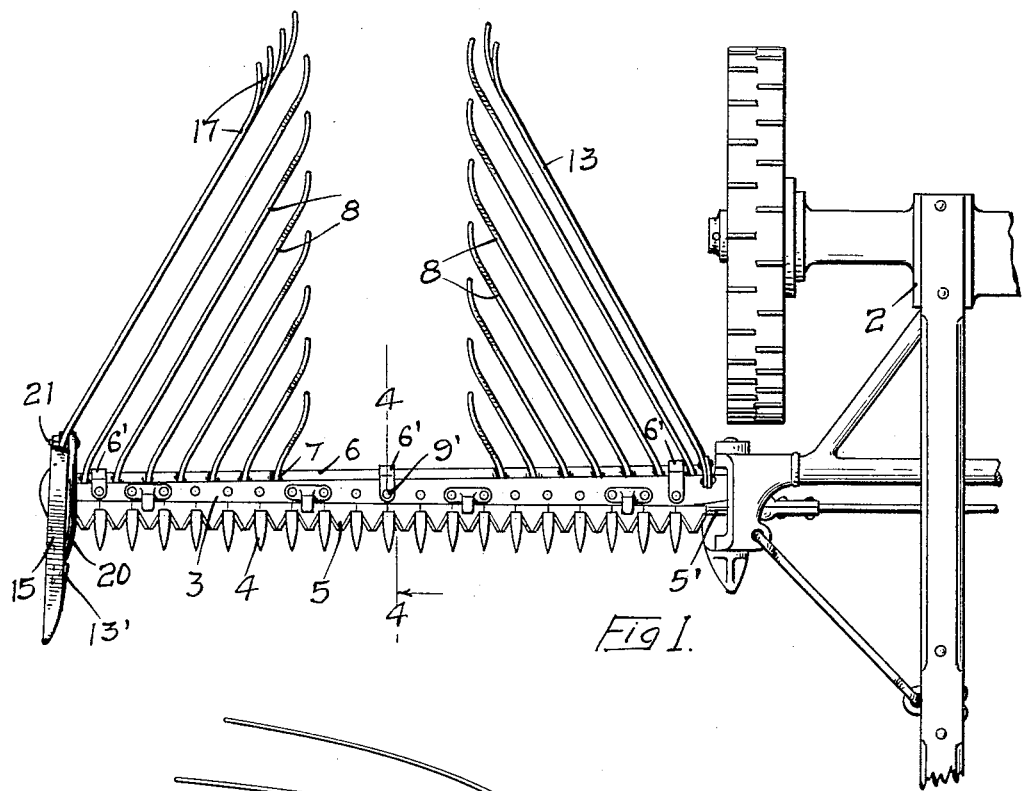
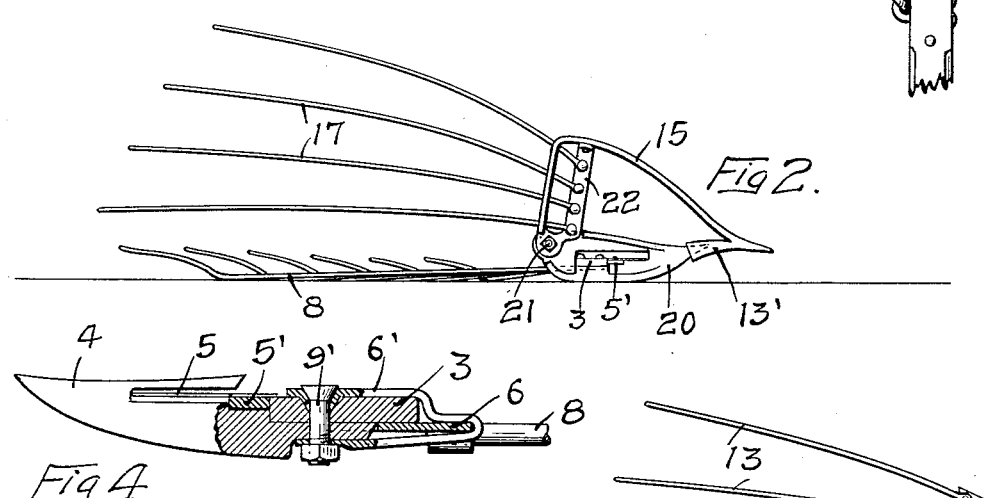
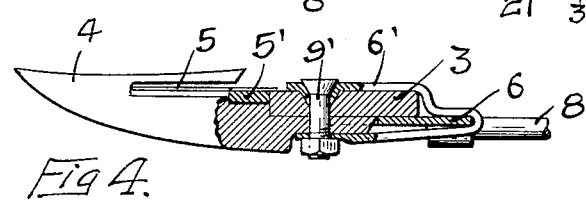
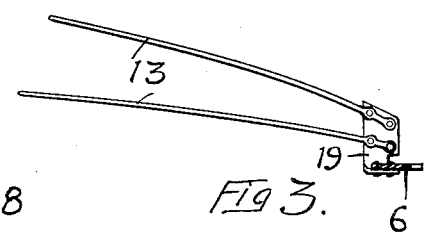
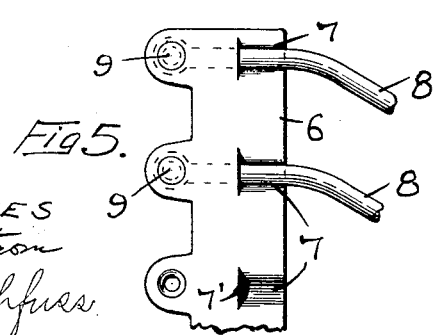
INVENTOR
IRVIN R. REBER
BY Paul & Paul
ATTORNEYS

UNITED STATES PATENT OFFICE.

IRVIN R. REBER, OF MARSHALL, MINNESOTA.

MOWER ATTACHMENT.

1,056,122.  Specification of Letters Patent.  Patented Mar. 18, 1913.

Application filed September 5, 1911. Serial No. 647,654.

*To all whom it may concern:*

Be it known that I, IRVIN R. REBER, a citizen of the United States, and a resident of Marshall, in the county of Lyon and State of Minnesota, have invented certain new and useful Improvements in Mower Attachments, of which the following is a specification.

This invention relates to improvements in attachments for mowing machines and is particularly designed for application to a mowing machine when the same is to be used for cutting flax.

The invention consists generally in the constructions and combinations hereinafter described and particularly pointed out in the claims.

In the accompanying drawings forming part of this specification, Figure 1 is a plan view of a portion of a mowing machine having my attachment applied thereto, Fig. 2 is a side elevation of the attachment, Fig. 3 is a section of the attachment taken on a line near the inner end of the same, Fig. 4 is a section on line 4—4 of Fig. 1, Fig. 5 is a detail plan view of a portion of the attachment.

It is a well known fact that it is very difficult to harvest flax without great loss from the shelling out of the seed as the flax is being cut and handled. Flax, as usually grown, is short and becomes very much tangled, and it is practically impossible to cut it with a binder. If an attempt is made to cut it with a binder a large amount of the seed is pounded out as the flax goes through the machine. Cutting flax is also very hard on the binder and will soon wear it out. If flax is cut with an ordinary mowing machine it is equally spread over the ground and the horses and the machine itself must pass over the cut grain and a great deal of the seed will be trampled or pressed out, thereby occasioning great loss. I overcome these objections by providing means whereby the cut flax is left in a substantially upright or vertical position, the cut grain being gently pressed toward the center line of the cutter bar thereby leaving the flax standing substantially vertical and in a windrow in line with the center of the cutter bar, so that the next time the team comes around the wheels of the mowing machine, and the horses, will pass upon opposite sides of the windrow of cut flax. The flax being left in a windrow is handled very easily and being in this position practically none of the seed is shelled out in the cutting of the grain, and none by the pressure of the horses or machine in passing over the same.

In the drawings, 2 represents a portion of a frame of a mowing machine, 3 represents the finger bar and 4 the slotted guards projecting forwardly from the finger bar and through which the knives 5 on the cutter bar or sickle 5′ reciprocate. The cutter bar is operated in the usual manner and the knives reciprocate through the slotted guards 4 also in the usual manner. For guiding the travel of the cut grain, while holding it in a substantially vertical position, I prefer to provide a bar 6 preferably having at its rear edge depressions 7 and openings 7′, and to this bar I secure a series of rods 8. These rods extend backward from the bar 6 and preferably, while they are substantially parallel to each other, they extend in diagonal lines converging toward each other, but leaving a central clear space in the rear of the center of the bar 6. The rods 8 are preferably secured to the bar 6 by rivets 9 which pass through eyes in the ends of the rods, and said rods also pass through the holes 7′ and the rear portions of the rods are preferably depressed so as to rest upon the surface of the ground as the machine is being moved forward. The rear ends of the rods 8 are elevated so as not to catch in the ground if the machine is moved backward. The bar 6 is preferably secured to the under side of the finger bar 3 by clips 6′ and bolts 9′, these bolts preferably securing certain of the guard fingers 4 to the finger bar 3.

The bar 6 is preferably cut away at its forward edge so as to form extensions between which are recesses into which the heels of the guard fingers 4 project. The ends of the rods 8 are riveted to the extensions 6″ by suitable rivets 9 and said extensions are preferably upwardly turned at their ends as are also the ends of the rods 8 where they are riveted onto said extensions. The rods 8 are held firmly to the bar 6 by rivets and by the depressions in the bar 6 in which the rods lie after they pass through the holes in said bar. This structure is clearly shown in Fig. 5 of the drawings. I prefer to secure the bar 6 to the under side of the finger bar 3, and to do this by means which permits a slight rocking movement of the bar 6, permitting the ends of the rods 8 to rise and fall as they pass over inequalities in the ground.

For securing the bar 6 to the finger bar, I preferably provide a series of the clips 6'. I have shown three such clips in the drawing and consider that this number will usually be sufficient. These clips are nearly U-shaped and pass around the bar 6 as shown in Fig. 4 of the drawings, and their free ends are secured to the finger bar 3 by bolts 9' which also secure the corresponding guard finger 4 in position as shown in Fig. 4 of the drawings. The bolts 9' which hold the clips in position are preferably a little longer than the bolts that are used for holding the other guards in position on the finger bar. At the inner end of the bar 6, I preferably provide a short standard 19, which is preferably riveted or otherwise suitably secured to the bar 6. This standard is preferably arranged in an inclined position, and inclined rods 13 are secured to it, one above another and they extend substantially over and parallel to the outermost and longest rod 8 upon that end of the cutter bar. At the other end of the bar 6 I preferably provide a divider 15. This is preferably formed as shown in Fig. 2, all in one piece, having a hook 13' at its forward end, adapted to hook onto the end of the shoe 20, and extending in a curved line upward and back to a point beyond the rear edge of the finger bar. It then extends downward toward the finger bar and is secured to the shoe 20 in place of the usual wooden divider, by a suitable bolt 21 such as is ordinarily used for securing the wooden divider board in position. This divider is then preferably extended upward, forming a standard 22, with its upper end secured to the upper portion of the divider. A series of rods 17 are secured to the standard 22 and project backward, one above another substantially parallel with the outermost rod 8 at that end of the cutter bar.

In operation, the cut grain remains in a substantially upright position, dropping, while remaining thus upright, down between the rods 8. As the machine advances the cut grain is moved inward by the rods 8 and the end rods 13 and 17, until it is compressed in a windrow back of the center line of the cutter bar, at the same time retaining its substantially upright position. This brings the cut flax into a windrow without its being rolled over or handled in any way that would cause the seed to be shaken out as is the case where the cut flax is rolled over or roughly handled in any manner. The grain passing back over the finger bar will be directed by the rods into the central windrow with the heads uppermost, where they will dry much more rapidly than when allowed to fall down upon the ground.

With this device the cutter bar passes under the severed flax leaving the straws substantially upright, and the contact of the straws with the rods 8, as the machine moves forward, slides the cut grain inwardly whereby it is brought into the space between the ends of the converging rods, and this will be done without any rolling or tumbling of the grain, or bringing any of the parts of the device in contact with the bolls or heads to shake out the seeds. The cut flax being left in a center windrow in this manner, when the team and the machine come around for the next cut, the wheels of the mowing machine straddle this windrow and the horses travel along one on each side thereof. There is, therefore, no trampling or pressing of the flax and no knocking or shaking out of the seed.

The details of the construction may be varied in many particulars without departing from my invention.

I claim as my invention:

1. The combination, with a mowing machine finger bar, of rods projecting rearwardly therefrom, said rods being arranged in groups, the rods of one group converging toward but separated from those of the other group, whereby a gap or opening is formed between the groups of rods into which the grain is directed to form a central windrow.

2. The combination, with a mowing machine bar, of a series of converging rods extending rearwardly from said bar, a gap or opening being provided between the rods on the opposite sides of the middle portion of said bar, the rods near the ends of said bar being arranged one above another in substantially vertical planes and operating to direct the grain in an upright position to the gap or opening formed between the opposing rods.

3. The combination, with a finger bar, of rods arranged in groups on each side of the middle portion of said bar and projecting rearwardly therefrom, the rods of one group converging toward but separated from those of the other group, whereby a lane or opening is provided between said groups of rods in the rear of the middle portion of said bar, the outer rods of each group being on a higher lever than the inner rods of the same group and operating to direct the grain in an upright position into a windrow in said lane or opening.

4. The combination, with a mower finger bar, of a bar 6, of means for securing said bar 6 to said finger bar, a series of converging rods 8, projecting rearwardly from the bar 6, and converging rods 13 and 17 arranged in planes above the level of said first named rods at the ends of said bar 6, substantially as described.

5. The combination, with a finger bar, of rods projecting rearwardly therefrom, said rods being arranged in groups on each side of the middle portion of said bar, the rods of one group converging toward but separated from those of the other group thereby forming a central lane or gap between them, said rods gradually increasing in length from the inner toward the outer rods of each group and said rods operating to direct the grain into a central windrow in the gap or opening between the groups of rods.

6. The combination, with a finger bar, of rods projecting rearwardly therefrom, the outer rods being arranged in substantially inclined planes and coöperating with the other rods to direct the grain into a central windrow in the rear of the middle portion of said finger bar.

7. The combination, with a finger bar and guides arranged in groups on each side of the middle portion of said bar and projecting rearwardly therefrom, the guides of one group being separated from those of the other group whereby a lane or opening is provided between said groups, the outer guides of each group being on a higher level than the inner guides of the same group and operating to direct the grain in an upright position in said lane or opening.

8. The combination, with a mowing machine finger bar, of guides projecting rearwardly therefrom, said guides being arranged in groups, the guides of one group converging toward but separated from those of the other group, whereby a gap or opening is formed between the groups of guides into which the grain is directed to form a central windrow.

In witness whereof, I have hereunto set my hand this 30th day of August 1911.

IRVIN R. REBER.

Witnesses:
 C. H. REHFUSS,
 A. M. WALSTROM.

Copies of this patent may be obtained for five cents each, by addressing the "Commissioner of Patents, Washington, D. C."